May 25, 1965  D. L. HAMMOND  3,185,037
DEVICE FOR PROVIDING SPIN ROCKET PRE-RELEASE DWELL TIME
Filed Jan. 27, 1964  2 Sheets-Sheet 1

INVENTOR
DAVID L. HAMMOND
BY
ATTORNEYS

May 25, 1965   D. L. HAMMOND   3,185,037
DEVICE FOR PROVIDING SPIN ROCKET PRE-RELEASE DWELL TIME
Filed Jan. 27, 1964   2 Sheets-Sheet 2

INVENTOR.
DAVID L. HAMMOND
BY
ATTORNEYS

United States Patent Office

3,185,037
Patented May 25, 1965

3,185,037
DEVICE FOR PROVIDING SPIN ROCKET
PRE-RELEASE DWELL TIME
David L. Hammond, Fullerton, Calif., assignor to the
United States of America as represented by the Secretary of the Air Force
Filed Jan. 27, 1964, Ser. No. 340,575
5 Claims. (Cl. 89—1.7)

This invention pertains to spin stabilized unguided rockets, and more particularly to a device for retaining an ignited spin type rocket in a launching tube until the rocket has accelerated to an aerodynamically stabilized spin rate.

Spin stabilized rockets depend upon the gyroscopic action of its rotating body for flight stabilization rather than the action of air current on the surface of a fin on a nonrotating fuselage.

Heretofore, spin stabilized unguided rockets have achieved their spin stabilization by external means mounted on a launching tube which rotated the rocket to the desired spin rate prior to release from the launching tube. This method, which required the addition of auxiliary spin motors and additional controls increased the complexity, cost and weight of the launch mechanism in addition to the reduced reliability of the rocket system.

It is the object of this invention to provide a means for retaining a spin type rocket in a launching tube until it has accelerated to an aerodynamically stabilized spin rate.

Another object of this invention is to provide a device for providing spin stabilization to spin type rockets prior to launching and which can be adjusted to various speeds of rotation.

Another object of this invention is to provide a spin stabilization control device for rocket launchers which facilitates rapid installation and maintenance of the rocket launching system.

A further object of this invention is to provide a device for spin stabilizing a rocket in a launching tube which is reliable in operation, rugged in construction, simple to install or maintain and economical to manufacture.

Briefly, the present invention comprises a releasable restraining device mounted in the base of a launching tube for retaining an ignited spin type rocket until it has accelerated to an aerodynamically stable spin rate prior to launching. A spring collet secured in the base of the launching tube is in engagement with a locking device on the base of the rotating rocket until a cam nut mounted on a threaded stud extending from the rocket base moves into engagement with the spring collet to release the rocket for launching.

A further object of the invention is the provision of a device as above noted wherein quick manual assembly and quick manual release are easily possible.

Other objects will become apparent to those skilled in the art in view of the subsequent disclosure and illustrations.

Figure 1:
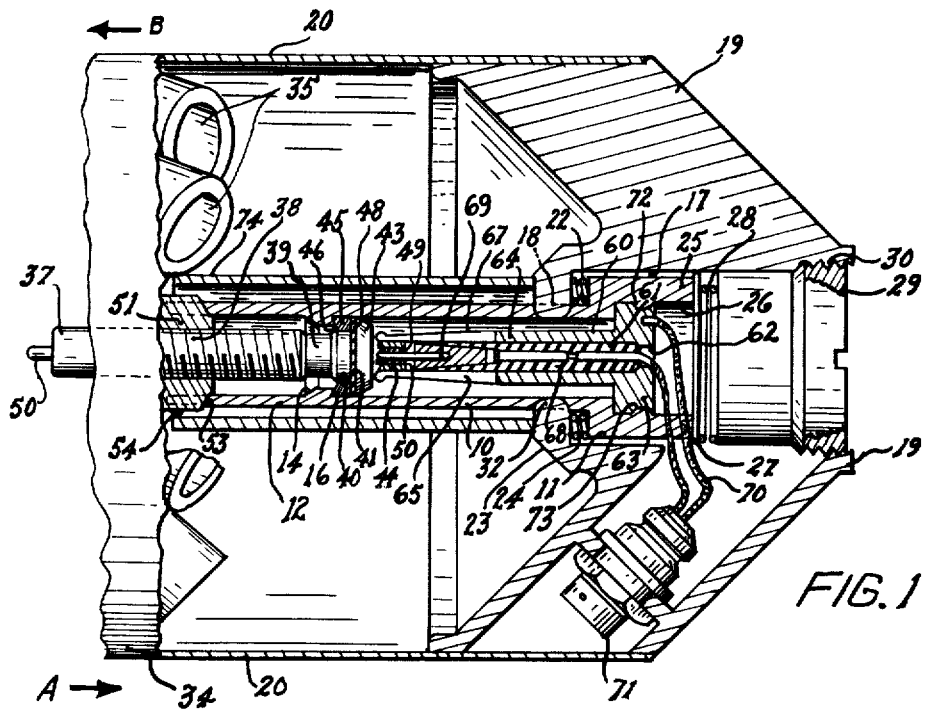
FIGURE 1 is a side elevation partly in cross section of the device mounted in a rocket launcher in a position for rocket firing.
Figure 5:
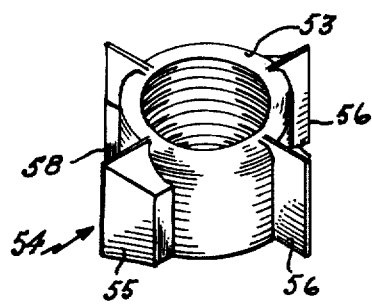
FIGURE 5 is a top perspective view of the cam nut.
Figure 2:
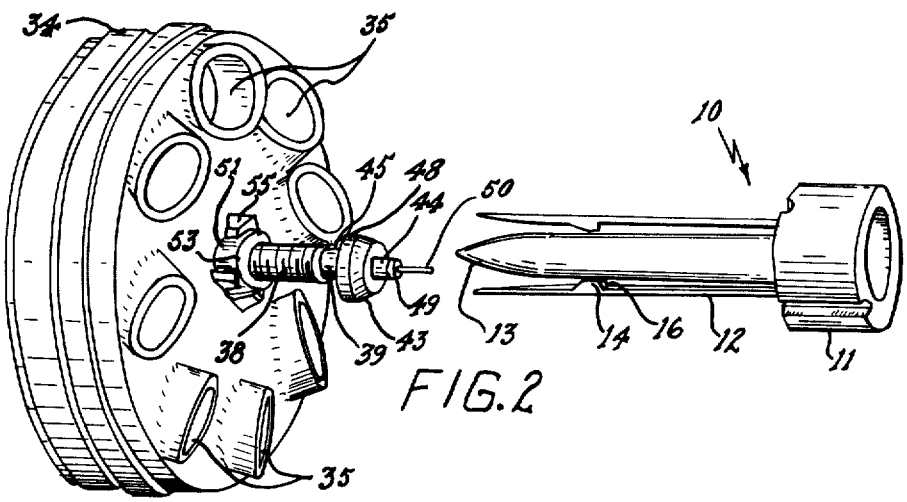
FIGURE 2 is a perspective view, parts removed, of the spring collet and the stud with the cam nut secured in the base of the rocket jet exhaust plate.

Referring to FIGURES 1 and 2, collet 10 having a hollow cylindrical base 11 is provided with axially extending spaced spring fingers 12 with tapered ends 13, see FIGURE 2. On the inner surface of each spring finger 12 is an inwardly projecting cam surface 14 having a detent shoulder 16. Collet 10 is positioned in bores 17 and 18 of spider support 19 rigidly secured in launching tube 20. The forward radial face 22 of collet base 11 is spaced from throat 23 of spider support 19 by Belleville spring 24. The rear radial face 25 of collet base 11 is secured in position by washer 27, Belleville spring 28 and a threaded plug 29 secured in threaded bore 30 of spider support 19. Projecting keys 32 on spider support throat 23 engage slots 33 between spring fingers 12 to prevent rotation of collet 10. Belleville springs 24 and 28 positioned fore and aft of collet base 11 permit limited axial movement of collet 10 during rocket launching thrust loads.

Rigidly mounted in the center of jet exhaust plate 34, having canted jet nozzles 35, is a hollow stud 37. The stud 37, which extends through the exhaust plate 34, has a threaded portion 38, a wrench flat section 39, a bearing journal surface 40 with a radial bearing surface 41, a cam surface 43 and a reduced diameter unthreaded end 44. A thrust bearing 45 having a concave radial face 46 is positioned on the journal bearing 40 and spaced from the radial bearing surface 41 by Teflon antifriction washers 48. Positioned internally of stud 37 is an electrical insulator 49 surrounding an electrical conductive rocket igniter probe 50. Mounted on the threaded portion 38 of stud 37 adjacent the jet exhaust plate 34 is a star shaped cam nut 51. The cam nut 51 is provided with a rounded shoulder 53, radial projections 54 each having a cam surface 55 and a guide surface 56, see FIGURES 2 and 3. The forward radial face of cam nut projections 54 are beveled to provide an additional cam surface 58. The radial projections 54 of cam nut 51 are positioned in slots 33 between spring fingers 12 of collet 10.

Mounted internally of collet 10 is an electrical connector support 60 which is similar in configuration to collet 10. The connector support 60, having bores 61 and 62, consists of an annular base 63, a sleeve portion 64 tapered from its central section and having axial slots 65 to provide spring fingers 67. Mounted internally of connector support 60 is an electrical insulator 68 enclosing a female electrical connector 69 and lead wires 70 in contact with electrical connector 71 positioned in spider support 19. The connector support 60 is secured against rotation in collet 10 by keys 72 on bore 26 of collet base 11 engaging splines 73 on the annular surface of connector support base 63. Spring fingers 67 of connector support 60 are in sliding engagement with end 44 of stud 37. The female connector 69 is in plug-in engagement with electrical igniter probe 50 of stud 37.

A protecting sleeve 74 rigidly secured to spider support 19 and terminating short of jet exhaust plate 34 prevents hot exhaust gases from damaging the igniting and release mechanism in the base of the launching tube 20.

In operation, the rocket 34 is pushed into the launching tube 20 in the direction of arrow "A," see FIGURE 1. Cam surface 43 of stud 37 engages cam surface 14 on spring fingers 12 of collet 10 causing the fingers 12 to spring outwardly, permitting the thrust bearing 45 to move into locking engagement with detent shoulder 16, see FIGURES 1 and 2. Electrical igniter probe 50 in stud 37 is pushed into mating engagement with female electrical connector 69 in connector support 60. Spring fingers 67 of connector support 60 are in sliding engagement with collet end 44 to secure the connector support in position on the probe 50.

The rocket is ignited by applying current to connector 71 which in turn energizes rocket igniter probe 50 by electrical contacts in connector support 60.

The forward movement of the rocket, not shown, in the direction of arrow "B," FIGURE 1, during the initial firing is prevented by the radial thrust bearing 45 being in locking engagement with the detent shoulder 16 on spring fingers 12 of collet 10. The canted jet exhaust nozzles 35 on exhaust plate 34 provide a rotary thrust for the rocket. The spring fingers 12 on collet 10 engage the guide surfaces 58 on cam nut 51 causing it to travel in the direction of arrow "A," FIGURE 1. As the cam nut 51 travels along the stud 16, the shoulder 53 on cam nut 51 engages the cam surfaces 14 of spring fingers 12 spreading the fingers 12 to release the thrust bearing 45 from locking engagement from detent shoulder 16.

Figure 4:
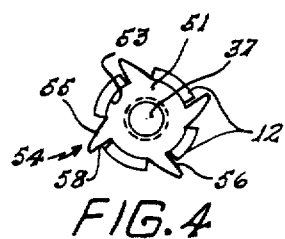
FIGURE 4 is a cross sectional view of the cam nut and spring collet in engagement.
Figure 3:
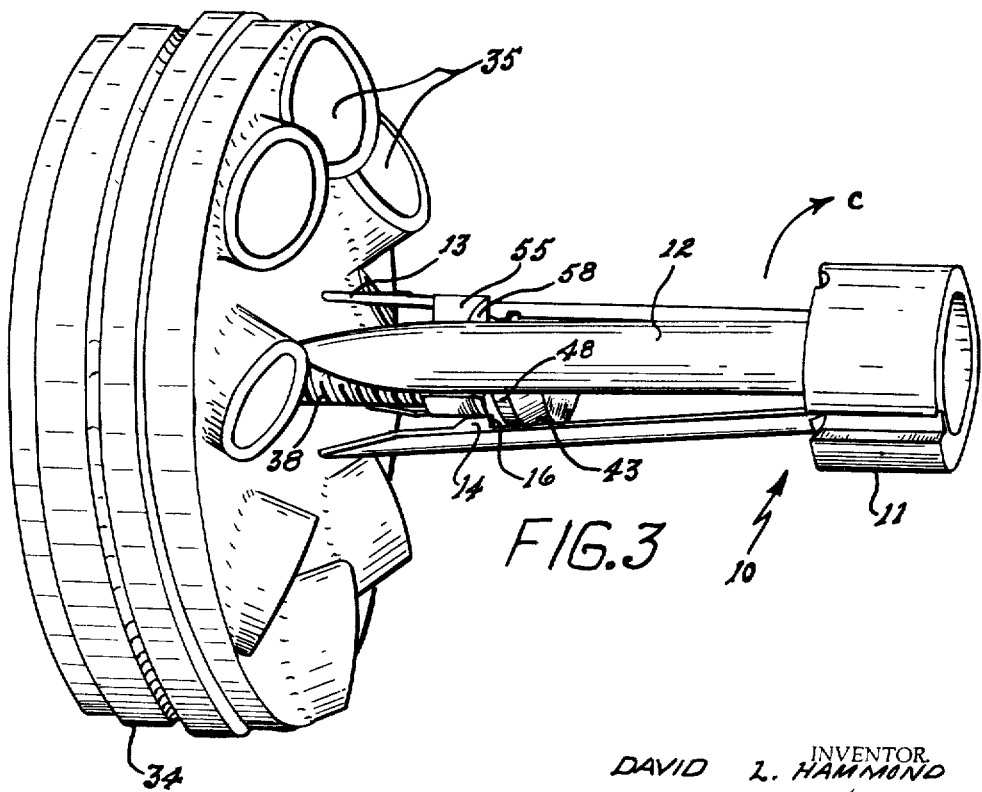
FIGURE 3 is a perspective view, parts removed, illustrating the cam nut expanding the spring collet to release the rocket for launching.

The time lapse required for the cam nut 51 to travel from a position adjacent the exhaust plate 34, see FIGURES 1 and 3, to the cam release point, see FIGURE 4, is predetermined to permit the rocket to accelerate to a stabilized spin rate prior to launching.

Manual release of the rocket from the collet 10 is accomplished by rotating the rocket one-fourth turn in the opposite direction, see FIGURE 6. When rotated in the direction of arrow "C," the spring fingers 12 of collet 10 engage cam surface 55 of cam nut 51 causing spring fingers 12 to spread releasing thrust bearing 45 from locking engagement with detent shoulder 16 on spring fingers 12.

What I claim is:

1. In a rocket launcher, a launching tube adapted to receive a spin rocket for launching, retaining means for retaining said rocket in said tube and releasing means for releasing said retaining means when a predetermined number of spins of said rocket has been effected, said retaining means comprising a threaded stud rigidly secured to said rocket to rotate therewith and extending rearwardly and centrally in said launching tube, a thrust bearing on said stud at its rearward end, said thrust bearing providing also a first element of a locking device, a spring collet, detent means on said spring collet providing the second element of said locking means for engaging said first element to retain said rocket in said launching tube, a base on said spring collet, keying means on said base for preventing rotation of said spring collet with respect to said launching tube, a walking nut threadedly engaged on said stud, projecting ears on said nut for keying said nut to said collet, said releasing means comprising interengaging cam surfaces on said nut and said collet whereby said first and second elements are detached to free said rocket from said launching tube when said walking nut reaches said thrust bearing.

2. In a rocket launcher, a launching tube adapted to receive a rocket to which spin may be imparted, means for retaining said rocket in said launching tube for a predetermined dwell time, said means comprising a nozzle plate on said rocket, a threaded stud arising centrally from said nozzle plate, said stud being rigidly secured in said nozzle plate to rotate therewith, an annular cam bearing on the end of said stud, a concave thrust bearing located on said stud adjacent said annular cam bearing and providing a first element of a locking means for retaining said rocket in said launching tube, a cam nut adapted to threadedly travel on said stud between said nozzle plate and said thrust bearing, projections on said cam nut, a collet keyed to said launching tube, spring fingers on said collet having interstices therebetween adapted to receive said projections on said cam nut so that said cam nut walks toward said thrust bearing during the spin of said nozzle plate, a detent and a cam surface on the inner surface of each of said spring fingers, said detent providing the second element of said locking means and engageable with said first element to retain said rocket in said launching tube, said last named cam surfaces adapted to engage said annular cam bearing when said nut reaches said thrust bearing, thereby springing said spring fingers radially outwardly to disengage the elements of said rocking means to release said rocket from said launching tube.

3. In a rocket launcher, a launching tube adapted to receive a spin type rocket, means for retaining said rocket in said tube and releasing said rocket when a predetermined dwell time after firing has been reached, said means comprising a rocket nozzle plate having canted rocket nozzles for imparting spin to said rocket, a hollow stud rigidly and centrally mounted on and extending through said rocket plate and adapted to accommodate electrical leads to a combustion chamber, an annular cam bearing on the rear of said stud, a thrust bearing on said stud, an annular detent on said thrust bearing screw threads on said stud between said nozzle plate and said thrust bearing, a spring collet keyed to said launching tube, a base on said collet, a bore in said base for accommodating electrical leads, means for making contact between said first named electrical leads and said second named electrical leads, spaced spring fingers on said base, extending forwardly therefrom and providing guiding slots therebetween, ends on said fingers, beveled portions on said ends, a detent on each finger for engaging said annular detent, a cam surface on said spring fingers for engaging said annular cam bearing, a walking cam nut threadedly engaging said stud, a cam surface on the top face of said nut, for engaging the ends of said spring fingers and beginning a spreading of said fingers, protruding ears on said nut adapted to engage in said guide slots, stops on each ear to prevent rotation of said nut with respect to said collet in one direction, cam surfaces on the top of each ear for engaging said finger ends for facilitating assembly, cam surfaces on the sides of each ear for engaging said beveled portions of said finger ends, to continue the spreading of said spring fingers to disengage the detents on each finger from the annular detent on said stud, whereby said nut walks on said stud, said cams are engaged as defined, spreading said fingers to release said rocket from said launching tube.

4. In a rocket launcher, a launching tube adapted to slidably receive a rocket, a nozzle plate on said rocket adapted to fit and slide in said tube, canted jet nozzles on said nozzle plate, retention means for retaining said rocket in said tube for a time sufficient to enable said rocket to achieve a stable spin rate, said retention means comprising a hollow stud rigidly attached to said nozzle plate, extending therethrough and providing access of electrical firing means to a combustion chamber, external screw threads on said stud, a thrust bearing on said stud presenting a negative angle to provide a first element of a locking means for retaining said rocket in said launching tube, an annular cam member on said stud, a supporting and housing member rigidly mounted in said launching tube, a spring collet, a base on said spring collet adapted to be housed in said support member and keyed thereto to prevent rotation of said collet with respect to said launching tube, a plurality of spaced spring fingers on said base, extending, when assembled, axially with respect to said stud, the edges of said spaced spring fingers providing guiding interstices, a finger-detent on the inner face of each of said spring fingers to provide a second element of said locking means and engageable with said first element to hold said missile in said launching tube, a finger-cam on said finger-detent, an internally threaded cam nut adapted to be threadedly engaged on said stud to travel thereon between said nozzle plate and said thrust bearing, ears on said cam nut adapted to fit and slide in said interstices, a stop on each of said ears to prevent relative rotation between said cam nut and said collet in one direction, a camming surface on the outer face of said nut to engage said finger-cams to begin spreading of said fingers, a cam on each of said ears to engage said beveled finger ends for effecting further spreading of said fingers when relative rotation occurs between cam nut and collet, as occurs when the cam nut has reached the extent of its travel on said stud, and abuts against said thrust bearing, thus disengaging the elements of said locking means, and freeing said rocket from said launching tube.

5. In a rocket launcher, a launching tube adapted to receive a rocket, locking means for retaining said rocket in said tube, means operated by the spin of said rocket for releasing said rocket when a predetermined dwell time has passed, said means comprising screw means attached to said rocket, a walking nut on said screw, said walking nut having cam means and guide means thereon, spring biased elements secured in said launching tube, said spring biased elements engaging said guide means on said walking nut to prevent its rotation, and interengaging means on said spring biased elements and said screw, cam means on said spring biased elements, said walking nut releasing the engagement of said interengaging means upon contact of the respective cam means.

References Cited by the Examiner
UNITED STATES PATENTS

| | | | |
|---|---|---|---|
| 2,831,400 | 4/58 | Hosli | 89—1.7 |
| 2,867,153 | 1/59 | Hirsch | 89—1.7 |
| 2,938,430 | 5/60 | Pion | 89—1.7 |
| 2,945,420 | 7/60 | Babcock | 89—1.7 |
| 2,945,421 | 7/60 | Pion | 89—1.7 |

BENJAMIN A. BORCHELT, *Primary Examiner.*